United States Patent

André

[11] Patent Number: 6,085,111
[45] Date of Patent: Jul. 4, 2000

[54] TELEPHONE AND DEVICE INTENDED TO BE ADAPTED TO SAID TELEPHONE WHEN OPERATING IN RESTRICTED MODE

[75] Inventor: Jean-Marie André, Le Mans, France

[73] Assignee: U.S. Philips Corporation, New York, N.Y.

[21] Appl. No.: 08/899,944

[22] Filed: Jul. 24, 1997

[30] Foreign Application Priority Data

Jul. 31, 1996 [FR] France .................................. 96 09638

[51] Int. Cl.⁷ .............................. H04B 1/38; H04M 1/00
[52] U.S. Cl. ......................... 455/553; 379/428; 379/433; 455/550; 455/40
[58] Field of Search ..................... 455/411, 565, 455/89, 90, 564, 574, 575; 379/199, 200, 433, 388, 389, 370

[56] References Cited

U.S. PATENT DOCUMENTS

| | | | |
|---|---|---|---|
| 4,724,537 | 2/1988 | Monet | 455/565 |
| 4,866,764 | 9/1989 | Barker, III | 379/368 |
| 4,885,762 | 12/1989 | Suzuki et al. | 455/565 |
| 4,945,556 | 7/1990 | Namekawa | 379/58 |
| 5,140,632 | 8/1992 | Anten | 379/447 |
| 5,241,583 | 8/1993 | Martensson | 455/565 |
| 5,247,565 | 9/1993 | Joglekar et al. | 455/565 |
| 5,365,570 | 11/1994 | Boubelik | 455/565 |
| 5,638,441 | 6/1997 | Hattori et al. | 379/433 |
| 5,646,604 | 7/1997 | Maruyama et al. | 455/411 |
| 5,711,013 | 1/1998 | Collett et al. | 455/90 |

FOREIGN PATENT DOCUMENTS

0354367A2  2/1990  European Pat. Off. ....... H04M 1/274

*Primary Examiner*—Curtis A. Kuntz
*Assistant Examiner*—Rexford N. Barnie
*Attorney, Agent, or Firm*—Dicran Halajian

[57] ABSTRACT

The invention relates to a telephone comprising a keyboard which has keys to which various functions are assigned. According to the invention, the operation of certain keys is admitting of being blocked, and the function assigned to the non-blocked keys is admitting of being modified.

A device is admitting of being adapted to said telephone to mask the blocked keys to the user. Advantageously, this device is a housing of a shock-resistant material.

Applications: The invention permits of modifying and simplifying the man-machine interface of a telephone.

Reference: FIG. 1.

10 Claims, 2 Drawing Sheets

TELEPHONE AND DEVICE INTENDED TO BE ADAPTED TO SAID TELEPHONE WHEN OPERATING IN RESTRICTED MODE

BACKGROUND OF THE INVENTION

1. Field of the Invention

The invention relates to a push-button telephone having means for changing from a normal operating mode to a restricted operating mode in which at least one pre-programmed function is assigned to at least one push-button, the operation of the other push-buttons being deactivated.

The invention likewise relates to a device intended to be adapted to such a telephone, said device comprising at least one push-button called visible push-button which is associated to a pre-programmed push-button of said telephone when said device is adapted to said telephone.

The invention finally relates to telephone equipment having such a push-button telephone and such a device.

The invention has highly significant applications notably in the field of mobile telephony.

2. Background of the Invention

Such equipment is described in European Patent Application n°0 354 367 A2, filed Jul. 11, 1989 by SANYO ELECTRIC CO. This equipment has a cover plate for masking the keyboard of the telephone and mechanical locking means for locking this cover plate on the telephone. By adapting the cover plate to the body of the telephone, a mode change key of the telephone is depressed, so that the telephone automatically changes from the normal operating mode to the restricted operating mode. In other words, the telephone is maintained in the restricted operating mode by mechanical means, which can be mischievously used.

OBJECTS AND SUMMARY OF THE INVENTION

It is a first object of the invention to provide telephone equipment solving this problem.

Therefore, a telephone according to the invention and as described in the opening paragraph is characterized in that said telephone comprises means for associating a secret code to said restricted operating mode and means for linking the change from said restricted operating mode to said normal operating mode with the prior input of said secret code.

The invention provides a logical protection of the telephone. It permits, for example, of lending a mobile telephone to a third person while avoiding risks of deterioration of the configuration of the apparatus, limiting risks of invoicing and ensuring that, in case of loss or robbery, the telephone will be unusable.

It is a further object of the present invention to provide, together with this logical protection, a physical protection of the telephone in order to avoid the telephone being deteriorated when it is dropped.

Therefore, in a particularly advantageous embodiment, a device according to the invention is a housing intended to contain a telephone and this device is made of a shock-resistant material.

It is another object of the present invention to provide an improved man-machine interface.

Therefore, a device according to the invention as described in the opening paragraph is characterized in that said visible push-button has affixing means for a user to affix a label to said visible push-button.

Thus, a user can affix to such a push-button a label that shows a pictogram, a photograph or a drawing of his/her choice, which adds to personalizing and simplifying the man-machine interface of the equipment. When the device according to the invention is intended to transform a telephone into a child telephone, this device has, for example, two visible push-buttons, one corresponding to Mum's telephone number and the other one to Dad's telephone number, and the photographs of Mum and Dad are affixed to these push-buttons.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENT

Figure 1:
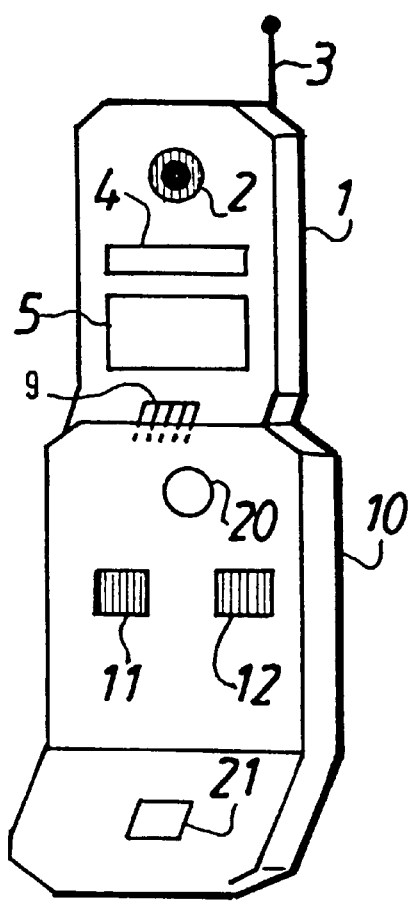
FIG. 1 represents in a diagrammatic manner an example of the telephone and a device intended to be adapted to this telephone.

In FIG. 1 is shown an example of a telephone 1 according to the invention. This telephone is a mobile telephone: it has a loudspeaker audio circuit 2, an antenna 3, a screen 4, a keyboard 5 and a microphone 9. Also shown in this Figure is a housing 10 which in this embodiment has two push-buttons, called visible push-buttons, referenced 11 and 12. This housing 10 also has two openings 20 and 21 intended to be located opposite the loudspeaker audio circuit 2 and the microphone 9 when the telephone is in place in the housing.

The shapes of this telephone and of this housing are provided such that the telephone can easily be accommodated in the housing.

In a particularly advantageous embodiment, such a housing is made of a shock-resistant material. This embodiment permits of ensuring the physical protection of the telephone.

Figure 2:
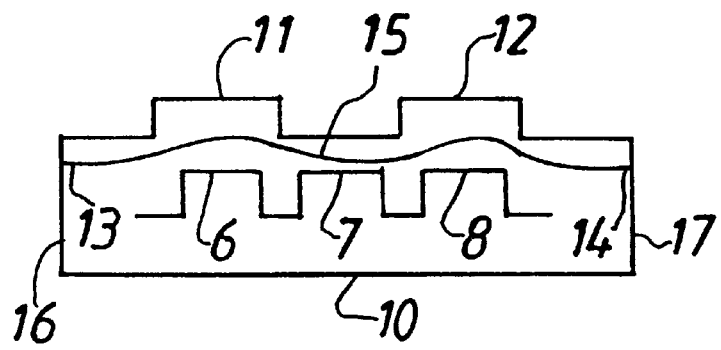
FIG. 2 is a sectional view of the telephone and of the device shown in FIG. 1.

In FIG. 2 is shown a sectional view of a telephone plus housing when the telephone is inside the housing. In this sectional view there appear three push-buttons referenced 6, 7 and 8 of a row of the keyboard 5. These push-buttons are called hidden push-buttons, because in this position they are not directly accessible to the user. The hidden push-button 6 is found underneath the visible push-button 11, and the hidden push-button 8 is found underneath the visible push-button 12. The ends 13 and 14 of a metallic slip 15 are stuck to the edge 16 and edge 17 respectively, of the housing 10, underneath the visible push-button 12. Thus, when the user depresses either visible push-button, the slip depresses the hidden push-button that is found underneath this visible push-button. This slip then plays the role of a spring in lifting the visible push-buttons again.

Figure 3:
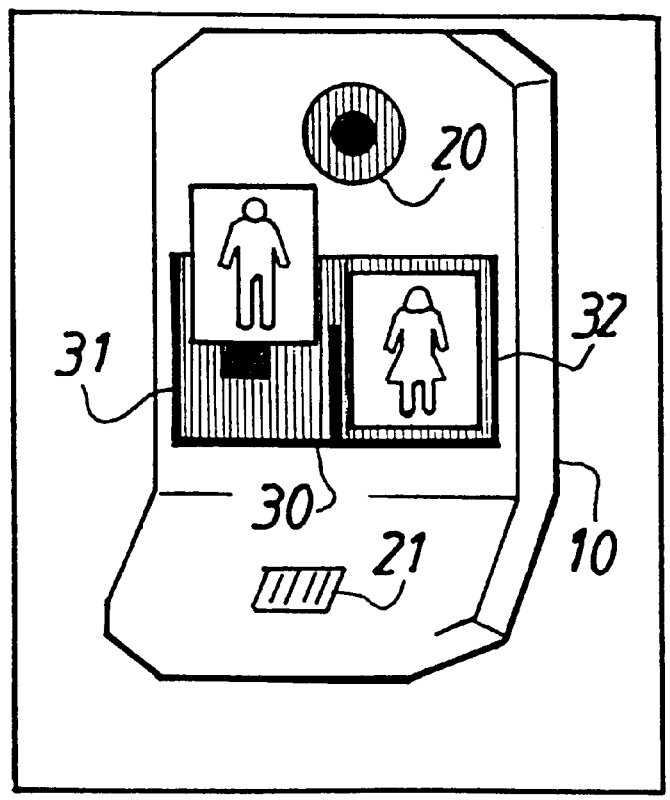
FIG. 3 represents an example of a housing according to the invention.

In FIG. 3 is shown an example of a housing in which a transparent plastic case 30 is stuck over the visible push-buttons. This case has two frames 31 and 32 centered on the visible push-buttons 11 and 12. A label can be slid into either frame. This label shows, for example, a pictogram, a photograph or a drawing. This embodiment permits of simplifying and personalizing the man-machine interface of the telephone.

According to the invention, means are provided for changing from a normal operating mode to a restricted operating mode and vice-versa. In restricted operating mode, certain push-buttons are deactivated, while the function assigned to certain other push-buttons (called pre-programmed push-buttons) is changed.

Therefore, when the respective telephone is a telephone having a screen that shows a management menu of the telephone, said menu may include, for example, a specific heading of "blocking" which contains, for example the following options:

blocking dialling of a first telephone number for the push-button 11, dialling of a second telephone number for the push-button 12, dialling of a secret code.

When the telephone does not have a screen, these operations are carried out, for example, by combinations of depressed push-buttons.

Figure 4:
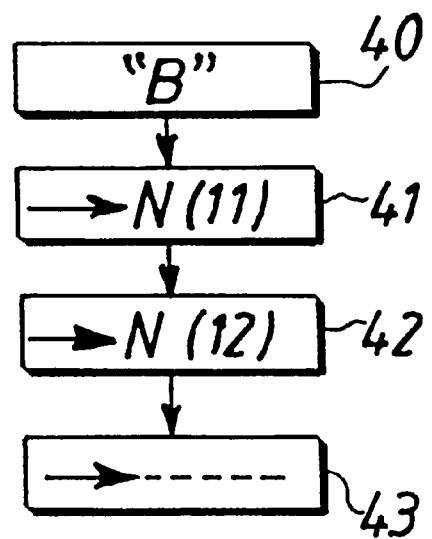
FIG. 4 represents a flow chart describing various steps of an example of the method according to the invention.

In FIG. 4 is shown by way of example a flow chart which gives an example of steps to be carried out for changing from a normal operating mode to a restricted operating mode.

In step 40 the user selects the heading of "blocking", which is symbolized by the legend "B" in FIG. 4. In step 41 he dials the telephone number N(11) assigned to the visible push-button 11, for example, Mum's telephone number. In step 42 he dials the telephone number N(12) assigned to the visible push-button 12, for example, Dad's telephone number. Then, in step 43 he dials his secret code number.

Then telephone changes to the restricted operating mode. The only authorized operations are depressing one of the visible push-buttons or one of the hidden push-buttons corresponding thereto, or dialling the secret code number that permits of returning to normal operation.

The invention that has just been described is advantageously used in the form of software in a telephone.

Obviously, modifications may be made to embodiments that have just been described, notably by substituting equivalent technical means, without leaving therefor the scope of the present invention.

The invention is not particularly restricted to mobile telephones, even if the invention provides particularly advantageous applications in this case.

Moreover, the device according to the invention, which is likely to be adapted to a telephone to modify the number of push-buttons accessible to the user, does not necessarily have its own visible push-buttons. In another embodiment, such a device may, for example, have openings giving direct access to the push-buttons which are found on the keyboard of the telephone. However, this embodiment is less advantageous in that it does not permit of modifying the indication shown on the push-button.

Furthermore, the new functions assigned to a push-button of the telephone are not of necessity a preprogrammed telephone number.

Finally, a classical keyboard with traditional push-buttons has been described. But the invention may also be applied to touch-sensitive screens.

What is claimed is:

1. A telephone comprising:

push-buttons;

means for changing a normal operating mode to a restricted operating mode in which a programmed function is assigned to a programmed button which is one of said push-buttons for dialing a programmed telephone number;

means for associating a secret code to said restricted operating mode;

means for changing from said restricted operating mode to said normal operating mode when said secret code is dialed; and a movable cover having a visible push-button which is aligned with said programmed button in a closed position so that activation of said visible push-button activates said programmed button, said movable cover masking push-buttons other than said programmed push-button, said visible push-button having a frame for removably receiving a label which is slid into said frame, said frame being located around a periphery of said visible push-button and leaving exposed a front side of said visible push-button.

2. The telephone of claim 1, wherein said push-buttons other than said programmed push-button are deactivated in said restricted operating mode.

3. The telephone of claim 1, wherein said movable cover is made of shock-resistant material.

4. A telephone comprising:

push-buttons which include at least two programmed buttons for dialing programmed telephone numbers in a restricted operating mode; and a movable cover having at least two visible push-buttons which are aligned with said at least two programmed buttons in a closed position so that activation of said at least two visible push-buttons activate said at least two programmed buttons, said movable cover masking push-buttons other than said at least two programmed push-buttons, each of said at least two visible push-buttons having a frame for removably receiving a label which is slid into said frame, said frame being located around a periphery of said at least two visible push-buttons and leaving exposed a front side of said at least two visible push-buttons.

5. The telephone of claim 4, wherein said push-buttons other than said at least two programmed push-buttons are deactivated in said restricted operating mode.

6. The telephone of claim 4, wherein said movable cover is made of shock-resistant material.

7. The telephone of claim 4, further comprising means for changing between a normal operating mode and said restricted operating mode when a secret code is dialed.

8. A device intended to be adapted to a telephone having push-buttons which include at least one programmed button for dialing a programmed telephone number in a restricted operating mode, said device comprising:

at least one visible push-button which is aligned with said at least one programmed button when said device is adapted to said telephone; said device masking buttons other than said at least one programmed push-button and preventing operations of said buttons; and a frame located partially around said at least one visible push-button for removably receiving a label which is slid into said frame, said frame being located around a periphery of said at least one visible push-button and leaving exposed a front side of said at least one visible push-button.

9. The device of claim 8, wherein activation of said at least one visible push-button activates said at least one programmed button.

10. The device of claim 8, wherein said device is made of shock-resistant material.

* * * * *